United States Patent Office 3,530,963
Patented Sept. 29, 1970

3,530,963
CLUTCH TRANSMISSION WITH BRAKE
Ernst Becker and Karl Notz, Darmstadt, Germany, assignors to Quick-Rotan Becker & Co., Darmstadt, Germany
Filed May 3, 1968, Ser. No. 726,413
Claims priority, application Germany, May 6, 1967, Q 943
The portion of the term of the patent subsequent to Dec. 30, 1986, has been disclaimed
Int. Cl. F16d 67/00
U.S. Cl. 192—4                                10 Claims

ABSTRACT OF THE DISCLOSURE

An auxiliary clutch and brake device is used for braking the output means of a main clutch. The rotary parts of the auxiliary clutch and brake device are driven through a step-up transmission from the input shaft of the main clutch at a higher speed than the input shaft, while the output means of the main clutch are driven by a reduction transmission from the auxiliary clutch and brake device at a reduced speed which is less than the speed of the motor shaft. When the rotary parts of the auxiliary clutch and brake device are braked to a stop, which requires a certain angular displacement, the output means of the main clutch are also stopped after turning through a smaller angle due to the high step-down ratio of the reduction transmission.

BACKGROUND OF THE INVENTION

Clutch and brake arrangements for motors are known in which a coupling means is shifted between a position in which an output shaft is driven, and a position in which the output shaft is braked quickly for the purpose of stopping a machine driven from the output shaft.

Clutch and brake arrangements of this type are particularly used for starting and stopping operations which are frequently interrupted. Motors with clutch and brake arrangements are particularly used for driving machine tools, winding machines, capacitor winding machines, and sewing machines.

Apparatus of this type known, and for example disclosed in the U.S. Pats. 3,174,450 and 3,253,562. The U.S. Pat. 3,174,450 also discloses an electromagnetically operated auxiliary transmission between the input clutch member and the output clutch member of a main clutch which makes it possible to rotate the output shaft at two different speeds.

Independently of whether the second lower speed stage is only to be used for stopping the output shaft, or for driving the same at a reduced speed, it is desirable to stop the output shaft very rapidly so that it turns only a very small angle after the brake has been applied.

Apparatus of this type is known in which the speed of the input shaft and the speed of the output shaft are in the ratio of 2:1, so that there is only a small transmission ratio between the auxiliary transmission and the output clutch member of the main clutch so that when the auxiliary device is braked, the output shaft of the main clutch turns a substantial angle.

SUMMARY OF THE INVENTION

It is one object of the invention to improve motor driven clutch and brake arrangements according to the prior art, and to provide an apparatus in which a driven shaft can be very rapidly stopped.

Another object of the invention is to provide a main clutch with an auxiliary coupling device which rotates at a higher rotary speed than the input shaft of the main clutch, and to reduce the speed of the output shaft of the main clutch by providing a reduction transmission having a high step-down ratio between the auxiliary device and the output clutch member of the main clutch.

In such an arrangement, the drive member of an auxiliary clutch rotates at a rotary speed higher than the speed of the motor input shaft of the main clutch, and, assuming that certain rotary speeds are predetermined for the input shaft and the output shaft of the main clutch, a particularly high transmission ratio between the auxiliary coupling device and the output clutch member of the main clutch is obtained. This has the great advantage, that the rotary movement of the auxiliary clutch is transmitted to the output shaft of the main clutch only with a great reduction according to the step-down ratio of the transmission.

In the preferred embodiment of the invention, the auxiliary clutch device is driven from the motor driven input shaft of the main clutch over a step-up transmission, while the output part of the auxiliary clutch device is connected with the output clutch member of the main clutch by a reduction transmission whose step-down ratio is greater than the step-up ratio between the input shaft and the auxiliary clutch. It is also possible to rotate the auxiliary clutch by an independent auxiliary motor.

The auxiliary clutch is preferably provided with an auxiliary brake so that due to the high step-down ratio between the auxiliary clutch and brake device and the output clutch member of the main clutch, the output shaft can be rapidly stopped by a comparatively small, but rapidly responding brake provided in the auxiliary device.

One embodiment of the invention comprises an input shaft, driven from a motor; main clutch means including a first clutch member secured to the input shaft, a second clutch member, an output shaft, and main coupling means connected with the output shaft for rotation and being operable between first and second coupling positions for coupling the output shaft with the first and second clutch members, respectively; an auxiliary clutch and brake device including a driven member, a brake member, and auxiliary coupling means operable between a driven position coupled with the drive member and a braked position braked by the brake member, and driving an auxiliary shaft; operating means preferably electromagnetically controlled, for operating the main coupling means and the auxiliary coupling means; drive means for driving the driven member of the auxiliary clutch and brake device at a higher speed than the speed of the input shaft at a predetermined step-up ratio; and reduction transmission means connecting the auxiliary coupling means with a second clutch member and having a step-down ratio greater than the step-up ratio at which the auxiliary clutch and brake device is driven.

When the main coupling means is in the second position and the auxiliary coupling means is in the braked position and is stopped by the brake member after turning a given angle, the second clutch member is stopped after turning a smaller angle than the given angle, and stops the main coupling means and the output shaft.

In one embodiment of the invention, a driven member of the auxiliary clutch and brake device is driven from the input shaft by a step-up pulley and belt transmission and the reduction transmission is a pulley-and-belt transmission connecting the shaft of the auxiliary clutch and brake device with the second clutch member.

In another embodiment of the invention, the drive means includes an auxiliary motor which is connected by a transmission to the driven member of the auxiliary device and drives the same at a higher speed than the speed of the input shaft.

The reduction transmission may also include a worm spindle and worm gear transmission which obtains the desired high step-down transmission ratio. The worm gear is secured to the second clutch member, and the worm spindle driven from the shaft of the auxiliary clutch and brake device.

When pulley transmissions are used, it is advantageous to make pulleys integral with the first and second clutch members, respectively.

The main clutch may be operated by electromagnetic means, or mechanically by a foot pedal for shifting the main coupling means between the coupling positions coupled with the first and second clutch members, respectively.

Preferably, the electromagnetic operating means of the main clutch include an annular magnetizable carrier surrounding the axially shiftable coupling means, which preferably includes two independently movable coupling members mounted on the output shaft for axial movement, and for rotation with the same.

The annular construction of the electromagnetic operating means has the advantage that a great deal of axial space is saved as compared with known electromagnetically operated clutch means. No return spring need be provided for the axially shiftable coupling members, when the same are independently operated by two windings mounted on the annular carrier. Consequently, no magnetic force is required for overcoming the force of the spring, as in the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
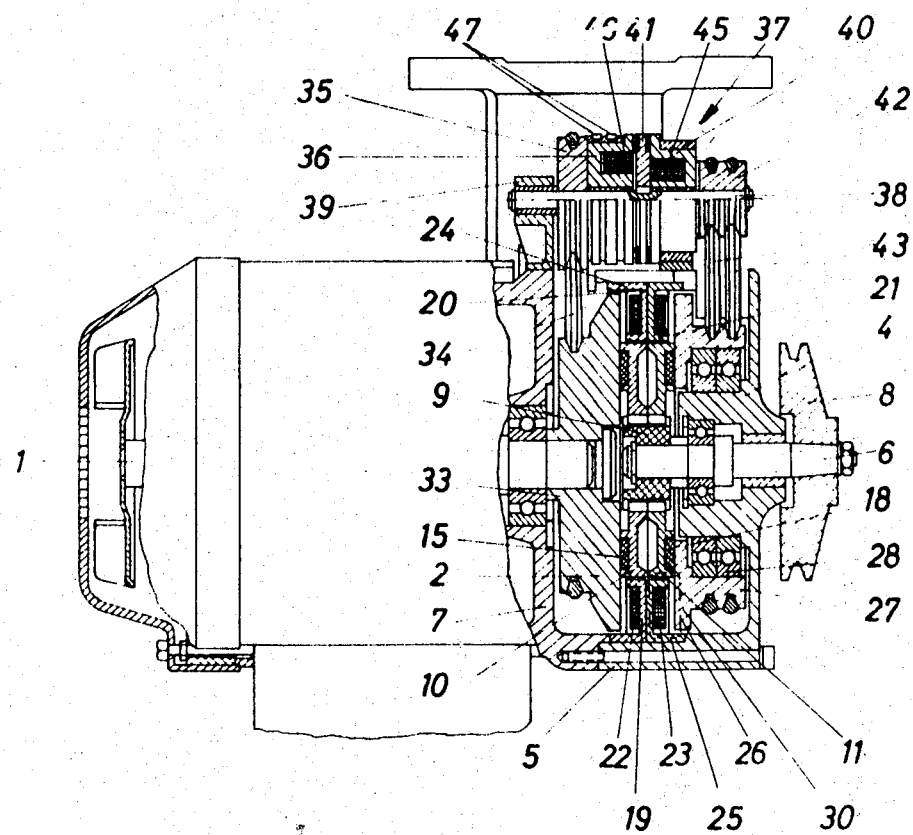
FIG. 1 is an elevation, partially in axial section, illustrating one embodiment of the invention in which the main clutch means is electromagnetically operated.

Referring first to FIG. 1, a motor in a motor housing 7, drives an input shaft 1, which carries a fixed clutch member 2 in the form of a flywheel provided with a pulley portion 33. An output shaft 6 is mounted in bearings of a housing sleeve 4 which is part of a housing portion 5 secured by bolts to the motor housing 7. Input shaft 1 and output shaft 6 are coaxial, and output shaft 8 carries a pulley 8 which can be connected to a drive shaft, not shown, driving a machine, not shown. The inner end of output shaft 6 carries a fixed sleeve 9 provided with splines and supporting two coupling members 10, 11 for independent axial movement, while being connected with output shaft 6 for rotation. Linings 15 and 18 are mounted in grooves of coupling members 10, 11 which consist at least partly of a magnetizable material. Lining 15 cooperates with a brake surface of clutch member 2, and lining 18 cooperates with a brake surface of a second clutch member 26 which is mounted on bearings 28 for free rotation and has a pulley portion 27. In the housing portion 5, annular electromagnetic operating means are mounted for pressing the coupling members 10 and 11, respectively against the first clutch member 2 and the second clutch member 26. The electromagnetic operating means include an annular carrier 19 which is coaxial with coupling members 10 and 11 and is shown to consist of two U-shaped annular rings 20 and 21 which are welded to each other. Annular windings 22 and 23 are mounted in rings 20 and 21. The outer circular peripheral portion 24 of carrier 19 is wider in axial direction than the inner peripheral portion 21, and has axially projecting end portions surrounding the circular peripheral edges of clutch members 2 and 26, providing only small cylindrical air gaps. Carrier 19, clutch members 2 and 26, and coupling members 10 and 11 consist, at least in the region of the windings 22 and 23, of a magnetizable material so that upon energization of winding 22, a magnetic flux passes through carrier 19, coupling member 10, and clutch member 2 for moving coupling member 10 in axial direction into engagement with clutch member 2, while upon energization of winding 23, a magnetic flux schematically indicated by a broken line, passes through carrier 19, coupling member 11, and clutch member 26 to press coupling member 11 into frictional coupling engagement with clutch member 26.

Pulley 33 which is fixedly connected with clutch member 2, drives another pulley 35 through a belt 34 at a rotary speed which is higher than the rotary speed of input motor shaft 1. Pulley 35 is secured to an annular driven member 36 and together with the same mounted for free rotation on an auxiliary shaft 38 which is supported for rotation in a housing part which also supports a stationary brake member 40. An auxiliary coupling plate 41 is mounted on auxiliary shaft 38 for axial movement between a driven position coupled with driven member 36, and a brake position frictionally engaging the stationary brake member 40. The shifting of coupling plate 41 is effected by annular windings 46 and 45 which can be selectively energized.

Another pulley 42 is secured to shaft 38 and connected by a pair of belts 43 to pulley 27 on clutch member 26. The transmission 42, 43, 27 is a reduction transmission whose step-down ratio is greater than the step-up ratio of the transmission 33, 34, 35.

It will be seen that the auxiliary device 37 includes a clutch and brake device which can be operated between a position in which drive means 1, 33 drives clutch member 26, and a position in which brake member 40 brakes the auxiliary coupling means 41, 38 so that clutch member 26 is braked through the reduction transmission 42, 43, 27. The rotary winding 46 of the driven member 36 is supplied with a voltage by slide rings 47 and slide contacts, not shown. Due to the selection of the transmission ratios, driven member 36 rotates at a higher speed than motor shaft 1, while clutch member 26 can be rotated at a rotary speed smaller than the speed of motor shaft 1.

When winding 23 is energized, the magnetic flux presses coupling member 11, and more particularly its lining 18 into coupling engagement with clutch member 26 so that output shaft 6 and coupling member 11 are coupled with the same. If at the same time, the brake winding 45 of the auxiliary device 37 is energized, the auxiliary coupling means 41, 38 is blocked, together with pulley 42, belt 43 and pulley 26 with clutch member 26 so that output shaft 6 is stopped.

If instead of windings 23 and 45, winding 22 of the main clutch, and winding 46 of the auxiliary clutch device are energized, coupling plate 41 with shaft 38 is connected with driven member 36 which is rotated from motor shaft 1 through the step-up transmission 33, 34, 35, and consequently clutch member 26 is rotated by the step-down transmission 42, 43, 27 at a lower rotary speed than shaft 1 which has no influence on output shaft 6 which is rotated by coupling member 10 coupled by the action of winding 22 with clutch member 2 and input shaft 1. Output shaft 6 rotates at the same speed as input shaft 1.

When now instead of winding 22, winding 23 is energized, coupling member 10 releases clutch member 2, and coupling member 11 is pressed against the slowly rotating clutch member 26 and driven by the same together with output shaft 6 at a lower speed than the speed of input shaft 1.

When brake winding 45 is now energized instead of coupling winding 46, coupling means 41 and shaft 38 are stopped, together with the step-down transmission 42, 43, 27 so that clutch member 26, coupling member 11, and output shaft 6 are also stopped.

Due to the fact that shaft 38 rotates at a higher speed than input shaft 1 so that a great step-down ratio between pulleys 42 and 27 must be provided, clutch member 26 can be rapidly braked to a stop by a comparatively small but quickly responding brake magnet 45 of the auxiliary device 37. Auxiliary coupling plate 41 slips a certain angle after moving into frictional contact with brake member 40, but this angle is transmitted to clutch member 26 and output shaft 6 at the step-down ratio so that output shaft 6 is stopped after turning through an angle which is smaller than the angle which coupling plate 41 slips on the stationary brake member 40 after energization of winding 45.

In constructions of the prior art where no step-up transmission is provided between the motor shaft 1 and the driven member 36, the step-down ratio of the reducing transmission 42, 43, 27 is much smaller, and consequently a less reduced angular displacement is transmitted to the output shaft 6.

In a similar manner, when auxiliary coupling means 41 is moved by coupling winding 46 to a position abutting driven member 36, coupling plate 41 slips a certain angle before being coupled with the rotating driven member 36. This slipping angle is transmitted at the high step-down ratio of transmission 42, 43, 27 to the output shaft 6.

Figure 2:
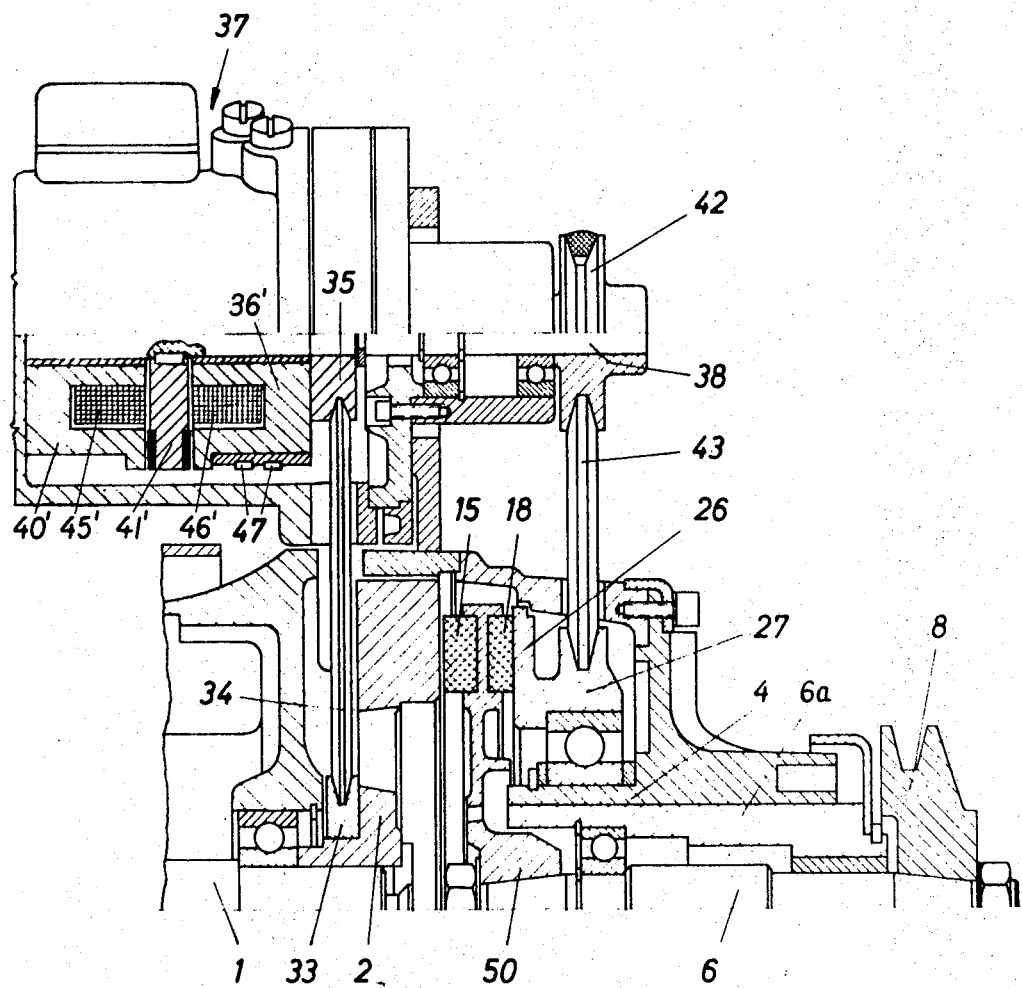
FIG. 2 is a fragmentary elevation, partially in axial section, illustrating a second embodiment of the invention in which the main clutch is mechanically operated.

The embodiment of FIG. 2 operates on the same principle as the embodiment of FIG. 1, and corresponding parts are indicated by like reference numerals. Instead of electromagnetically operated coupling members, a mechanical coupling means 50, provided with linings 15 and 18, is mounted on shaft 6 for axial movement between first and second positions respectively coupled with the clutch member 2 and clutch member 26. Clutch member 2 is secured to the input shaft 1, which is driven by a motor. The coupling means 50 is mechanically shifted together with output shaft 6 by a coupling lever, not shown, acting on an axially shiftable sleeve 6a, substantially as described in the U.S. Pats. 3,174,450 and 3,253,562. A step-up transmission, including pulley 33, belt 34, and pulley 35 is connected with an auxiliary clutch and brake device as described with reference to FIG. 1, and the auxiliary shaft 38 is connected by a step-down transmission including pulley 42, fixed on shaft 38, belt 43, and pulley 27 integral with clutch member 26. Since the coupling means 50 is narrow in axial direction, the axial space between pulleys 42 and 35 is insufficient for the auxiliary clutch and brake device 37' so that the same is mounted on the left side of pulley 35, as viewed in FIG. 2. When the coupling winding 46' of the auxiliary device 37 is energized, coupling plate 41' is coupled with driven member 36' and pulley 35, and since coupling plate 41' is connected with shaft 38' for rotation, pulley 35 on shaft 38 is coupled to shaft 38 for driving clutch member 26 through the step-down transmission 42, 43, 27, and when the brake winding 45' of the auxiliary device is energized, the auxiliary coupling plate 41' is stopped by the fixed brake member 40', and stops shaft 38, and thereby through the step-down coupling also clutch member 26. When by operation of the mechanical coupling means 50, output shaft 6 is connected with clutch member 26, the output shaft is stopped.

Assuming that the clutch transmission of FIG. 2 is to be used for driving the main shaft of a sewing machine, the motor may have six poles so that shaft 1 rotates at 900 r.p.m. The diameters of pulleys 33 and 35 may be selected so that auxiliary shaft 38 rotates at 2,150 r.p.m., which is faster than the motor shaft 1, while the diameters of pulleys 42, 27 are selected so that clutch member 26 rotates at 450 r.p.m., which is less than the rotary speed of input shaft 1.

Consequently, the auxiliary brake member of the auxiliary device 37 will cooperate with an auxiliary coupling plate which rotates at a higher speed than motor input shaft 1, and be consequently more effective in rapidly stopping output shaft 6.

It will be understood that each of the elements described above, or two or more together, may also find a useful application in other types of clutch transmissions differing from the types described above.

While the invention has been illustrated and described as embodied in a clutch and brake transmission including an auxiliary device having a step-up transmission and a step-down transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Clutch and brake transmission, comprising, in combination, an input shaft; main clutch means including a first clutch member secured to said input shaft for rotation, a second clutch member, an output shaft, and main coupling means connected with said output shaft for rotation and being operable between first and second coupling positions for coupling said output shaft with said first and second clutch members, respectively; an auxiliary clutch and brake device including a driven member, a brake member, auxiliary coupling means operable between a driven position coupled with said drive member and a braked position braked by said brake member, and an auxiliary shaft parallel to said input shaft and output shaft, and supporting said auxiliary coupling means for axial movement between said driven and braked positions; operating means for operating said main coupling means and said auxiliary coupling means between said positions of the same; drive means for driving said driven member at a higher speed than the speed of said input shaft at a predetermined step-up ratio; and reduction transmission means connecting said auxiliary shaft with said second clutch member and having a step-down ratio greater than said step-up ratio so that, when said main coupling means is in said second position and said auxiliary coupling means is in said braked position and is stopped by said brake member after turning a given angle, said second clutch member is stopped after turning a smaller angle than said given angle and stops said main coupling means and said output shaft.

2. Clutch and brake transmission, comprising, in combination, an input shaft; main clutch means including a first clutch member secured to said input shaft for rotation, a second clutch member, an output shaft, and main coupling means connected with said output shaft for rotation and being operable between first and second coupling positions for coupling said output shaft with said first and second clutch members, respectively, said main coupling means having an outer peripheral portion adjacent said carrier and consisting of a magnetizable material, said first and second clutch members having magnetizable portions located on the opposite sides of said carrier for providing flux paths for magnetic fields produced by said windings; an auxiliary clutch and brake device including a driven member, a brake member, and auxilitary coupling means operable between a driven position coupled with said driven member and a braked position braked by said brake member; operating means for operating said main coupling means and said auxiliary coupling means between said positions of the same and including electromagnetic operating means for shifting said main coupling means between said first and second coupling positions, said electromagnetic operating means including an annular magnetizable carrier surrounding said main coupling means, and two annular windings supported on said carrier; drive means for driving said driven member at a higher speed than the speed of said input shaft at a predetermined step-up ratio; and reduction transmission means connecting said auxiliary coupling means with said second clutch member and having a step-down ratio greater than said step-up ratio so that, when said main coupling means is in said second position and said auxiliary coupling means is in said braked position and is stopped by said brake member after turning a given angle, said second clutch member is stopped after turning a smaller angle than said given angle and stops said main coupling means and said output shaft.

3. Clutch transmission as claimed in claim 2 wherein said drive means include a step-up transmission connecting said input shaft means with said driven member of said auxiliary device and having said step-up ratio.

4. Clutch transmission as claimed in claim 3 wherein said step-up transmission include a pulley and belt transmission connecting said driven member with said first clutch member.

5. Clutch transmission as claimed in claim 4 wherein said reduction transmission means includes a pulley and belt transmission connecting said auxiliary coupling means with said second clutch member.

6. Clutch and brake transmission as claimed in claim 2 wherein said auxiliary clutch and brake device includes an auxiliary shaft connected by said reduction transmission means with said second clutch member, wherein said auxiliary coupling means is mounted on said auxiliary shaft for axial movement between said driven and braked positions, and connected with the same for rotation therewith, wherein said operating means include an auxiliary coupling winding supported by said driven member and an auxiliary brake winding supported by said brake member and being selectively energizable for shifting said auxiliary coupling means between said driven and braked positions; wherein said drive means include a step-up transmission connecting said first clutch member and said input shaft with said driven member of said auxiliary clutch and brake device; and wherein said reduction transmission means connects said auxiliary shaft with said second clutch member for rotation.

7. Clutch and brake transmission as claimed in claim 2 wherein said main coupling means includes two coupling members mounted adjacent each other on said output shaft for axial movement relative to the same, and for rotation with the same; and wherein said coupling members are respectively operated by said windings to move to said first and second coupling positions, respectively.

8. Clutch and brake transmission, comprising, in combination, an input shaft; main clutch means including a first clutch member secured to said input shaft for rotation, a second clutch member, an output shaft, and main coupling means connected with said output shaft for rotation and being operable between first and second coupling positions for coupling said output shaft with said first and second clutch members, respectively; an auxiliary clutch and brake device including a driven member, a brake member, auxiliary coupling means operable between a driven position coupled with said drive member and a braked position braked by said brake member, and an auxiliary shaft parallel to said input shaft and output shaft and supporting said auxiliary coupling means for axial movement between said driven and braked positions; operating means for operating said main coupling means and said auxiliary coupling means between said positions of the same; drive means including a step-up transmission connecting said input shaft with said driven member of said auxiliary clutch and brake device so that said driven member is driven at a higher speed than the speed of said input shaft at a predetermined step-up ratio, said step-up transmission including a pulley secured to said first clutch member for rotation, a pulley secured to said driven member for rotation, and belt means connecting said pulleys; and reduction transmission means including a pulley secured to said second clutch member, a pulley connected with said auxiliary shaft for rotation, and belt means connecting said pulleys of said reduction transmission means, said reduction transmission means having a step-down ratio greater than said step-up ratio so that, when said main coupling means is in said second position and said auxiliary coupling means is in said braked position and is stopped by said brake member after turning a given angle, said second clutch member is stopped after turning a smaller angle than said given angle and stops said main coupling means and said output shaft.

9. Clutch and brake transmission as claimed in claim 8 wherein said operating means includes mechanical means for moving said main coupling means between said first and second coupling positions.

10. Clutch and brake transmission as claimed in claim 8 wherein said operating means includes an electromagnetic operating means for shifting said main coupling means in axial direction between said first and second coupling positions.

References Cited
UNITED STATES PATENTS

| | | | |
|---|---|---|---|
| 2,856,044 | 10/1958 | Koenig et al. | 192—4 |
| 2,129,847 | 9/1938 | Knodel | 192—12.2 X |
| 2,401,003 | 5/1946 | Lear | 192—9 X |
| 2,498,244 | 2/1950 | Bromfield | 192—9 |
| 3,174,450 | 3/1965 | Becker et al. | 192—18.2 X |
| 3,387,689 | 6/1968 | Ovshinsky. | |

BENJAMIN W. WYCHE III, Primary Examiner

U.S. Cl. X.R.

192—9, 18